Feb. 25, 1936.  V. W. KLIESRATH  2,031,716
CLUTCH CONTROL MECHANISM
Filed July 29, 1931  2 Sheets-Sheet 1

INVENTOR.
VICTOR W. KLIESRATH
BY H. O. Clayton
ATTORNEY.

Feb. 25, 1936.   V. W. KLIESRATH   2,031,716
CLUTCH CONTROL MECHANISM
Filed July 29, 1931   2 Sheets-Sheet 2

INVENTOR.
VICTOR W. KLIESRATH
BY H. O. Clayton
ATTORNEY.

Patented Feb. 25, 1936

2,031,716

UNITED STATES PATENT OFFICE 2,031,716

CLUTCH CONTROL MECHANISM

Victor W. Kliesrath, South Bend, Ind., assignor to Bragg-Kliesrath Corporation, South Bend, Ind., a corporation of New York Application July 29, 1931, Serial No. 553,730

4 Claims. (Cl. 192—.01)

The invention relates in general to the power transmission mechanism of an automotive vehicle and in particular to means for controlling the operation of the conventional clutch connecting the power plant with the driving shaft.

The present vogue of free wheeling or automatic declutching of the aforementioned driving and driven elements of the propelling mechanism has given rise to numerous new problems in the control of the vehicle; not the least of such problems is that of starting the vehicle in traffic and with the clutch disengaged by virtue of the operation of the free wheeling mechanism.

The present invention is particularly concerned with that type of declutching or free wheeling device disclosed in the patent to Belcia, No. 1,470,272, dated October 9, 1923, wherein the clutch pedal is automatically vacuum operated to disengage the clutch plates when and if the accelerator pedal is released to idle the engine, and likewise automatically permitted to return to its clutch engaged position as the accelerator is moved to open the throttle; however, it is apparent that a control of the clutch engagement is desirable with the construction disclosed in said patent, particularly when the car is at a standstill before a stop light, for it is at this time that a slipping engagement of the clutch plates is demanded. At this time the driven plate is at rest and with the opening of the throttle and corresponding increase in R. P. M. of the driving plate it is necessary to ease in or slip the clutch to start the car smoothly.

Therefore, it is the principal object of the invention to improve the clutch mechanism of the aforementioned patent by providing means for controlling the engagement of the clutch in starting the car, such means to simulate the corresponding conventional manual operation.

To the above end there is suggested a supplemental valve, preferably manually operated, for controlling the rate of clutch pedal movement under the action of the clutch spring.

There is further contemplated a structure wherein the operation of a valve independent of the conventional actuator control valve provides a dashpot control of the piston of a vacuum operated clutch operating fluid motor, said dashpot control being on the non-suction side of the piston.

A further object of the invention is to provide an adjunct to a vacuum operated clutch actuator, which adjunct may be readily attached to the actuator, the function of said supplemental mechanism being to provide a means, independent of the conventional actuator control valve, for controlling the clutch engaging phase of operation of the actuator.

The invention in its broadest aspect comprehends a manually operable means, supplementing the power mechanism for disengaging the clutch, said means being operable at the will of the driver to control the rate of movement of the clutch pedal or equivalent means in its clutch engaging movement.

Other objects of the invention and desirable details of construction and combinations of parts will become apparent from the following detailed description of certain preferred embodiments of the invention taken in conjunction with the accompanying drawings, in which.

Figure 3:
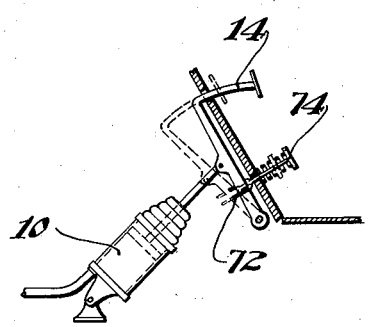
Figure 4:
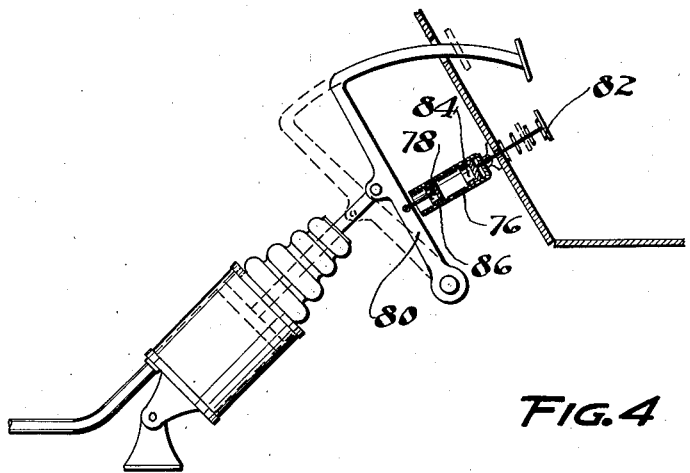
Figure 5:
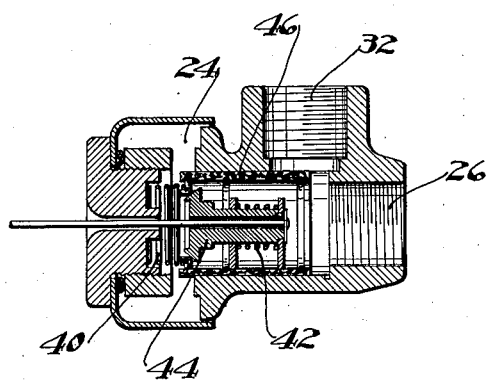

Figures 3 and 4 disclose alternative forms of supplemental clutch control means; and Figure 5 is a sectional view of the valve structure controlling the operation of the power means with which the aforementioned supplemental devices cooperate.

Figure 1:
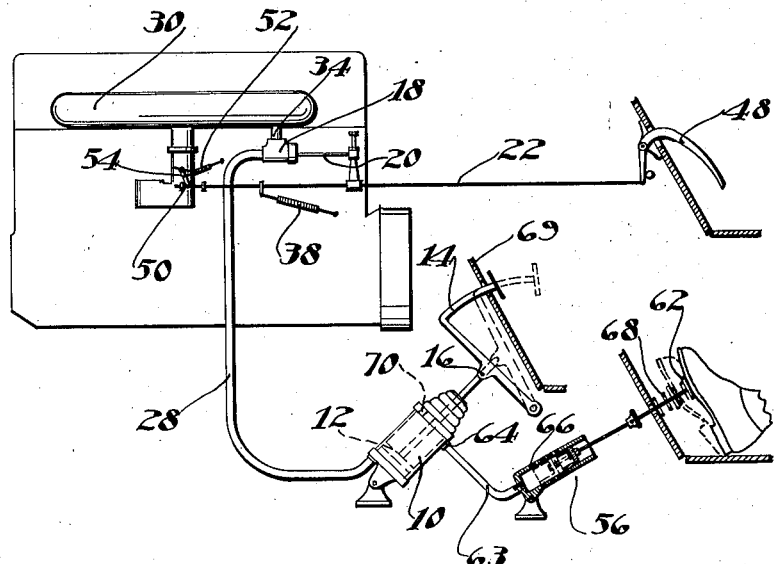
Figure 1 is a diagrammatic view of the clutch mechanism of the instant invention illustrating one form of supplemental means for controlling the clutch engagement.

In that embodiment of the invention disclosed diagrammatically in Figure 1 there is provided a power actuator comprising a double ended cylinder 10 and piston 12, the latter being pivotally connected to the clutch pedal 14 at 16. The actuator is adapted to be energized at closed throttle to move the pedal to its disengaged position shown in full lines in the figure, and, broadly stated, to this extent the present invention is substantially the same as that of the aforementioned Patent No. 1,470,272. Briefly, the remaining power mechanism comprises a three-way valve member 18 which is operated, through the intermediary of links 20 and 22, to either vent the actuator to atmosphere via valve ports 24 and 26 and conduit 28, Figure 3, or place the actuator in circuit with the manifold 30 via valve ports 32 and 26 and conduits 34 and 28 to induce a vacuum on the suction side of the actuator piston 12. The valve structure per se, Figure 3, is more completely described, disclosed and claimed in an application of Victor W. Kliesrath, No. 568,082, filed October 10, 1931, and forms no part of the instant invention. At closed throttle position, Figure 1, the links 20 and 22 are tensioned by spring 38 to compress valve springs 40 and 42, positioning valve members 44 and 46 to place the manifold in circuit with the actuator and thus induce a vacuum in the latter to disengage the clutch. Clockwise throttle opening movement of the accelerator pedal 48 places link 22 in compression, further tensioning spring 38 thereby permitting compressed valve springs 40 and 42 to successively expand to close the vacuum port 32 and open the atmospheric port 24. The suction chamber of the actuator is then brought back to atmospheric pressure to permit clutch engagement in a manner to be more fully described hereinafter. It will also be noted that the lost motion at 50 and separate tension spring 52 on the butterfly valve lever 54 insure a successive venting of the actuator and opening of the throttle on the throttle opening movement of the accelerator and a successive closing of the throttle and energizing of the actuator on the throttle closing movement of the accelerator pedal.

The invention is particularly directed to means for damping or buffing clutch engagement, and more particularly to manually operated means for determining the rate of movement of the clutch pedal during the engaging phase of the clutch operation. To this end there is disclosed in Figure 2 what may be termed an adjunct to the conventional actuator comprising a piston valve 56, the casing 58 of which is preferably pivotally secured to the chassis and the piston 60 of which is operated directly by the operator's foot through the intermediary of a spring pressed treadle member 62. The valve casing is placed in circuit with the actuator cylinder by means of conduit 63, which may be detachably connected to the actuator casing at 64. The valve casing is further provided with a plurality of openings 66 arranged annularly about the cylinder, there being a plurality of rows of such openings, all as disclosed in Figure 2.

Figure 2:
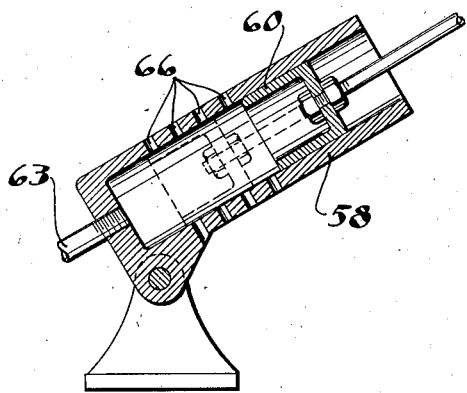
Figure 2 is an enlarged sectional view of the supplemental control means of Figure 1.

Describing now the operation of the aforementioned collateral structure, the treadle spring 68 normally maintains the piston in the full line position of Figure 2, the atmospheric ports 66 venting the non-suction chamber of the actuator. In starting the car either from a parked position or in traffic it is necessary to slip the clutch into engagement, and ordinarily this is done by the easing in of the clutch pedal. However, with the power operated clutch mechanism disclosed manual control of the clutch pedal is not contemplated; in fact the upper portion of the conventional pedal 14, protruding from the floor board 69, may be done away with entirely. Accordingly, with the aforementioned Belcia patented construction, venting of the actuator upon opening of the throttle permits the conventional clutch spring, not shown, to more or less violently move the driven clutch plate into engagement with the driving clutch plate resulting in a possible stalling of the engine or a grabbing of the clutch.

However, with the aforementioned adjunct the rate of movement of the clutch pedal and, therefore, the timing of the clutch engagement is determined by the rate of efflux of air from the openings 66 under the action of the collapsing clutch spring. In starting the car in traffic or under any other conditions wherein the car is not in motion it is merely necessary for the operator to first fully depress the valve piston 60 to the dotted line position of Figure 2 and then release the piston to the position desired to thereby determine the rate of clutch pedal movement. Should a more rapid clutch engagement be desired, for example where the torque load of the driven shaft is relatively low, the treadle 62 may be permitted to move further outwardly under the action of spring 68. A continuous movement of the treadle will progressively increase the rate of clutch pedal movement as more openings 66 are exposed to atmosphere and the rate of efflux of air increased. The driver will, however, soon determine the most effective position of the pedal for ordinary starts in traffic upon a level and relatively smooth roadway.

If desired, the valve 56 may be employed to time the clutch engagement with the vehicle in motion and free wheeling. However, the structure is particularly intended to facilitate the necessary slipping of the clutch in starting the car in traffic. In order to render the device "fool proof" a small opening 70 in the cylinder end may be provided, thus permitting the clutch to disengage should the valve 56 be inadvertently closed during the operation of the vehicle. With the foot removed from the treadle during normal operation of the car the openings 66 permit a normal operation of the actuator with only a limited degree of dashpot effect during the clutch engaging operation; such degree of dashpot operation is, however, preferably predetermined to provide a clutch engaging rate best adapted to ordinary driving conditions.

There is thus provided a valve means collateral to the power actuator and providing a manually adjustable dashpot control of the clutch engagement, thus facilitating the starting of a car equipped with power operated clutch control mechanism.

If desired, the structure of Figure 3 may be employed to buff the clutch engagement wherein the forked end 72 of a spring pressed treadle member 74 just engages the clutch pedal with the clutch engaged, as disclosed in full lines. With the pedal in its disengaged position under the action of the power actuator the treadle may be manually pressed to engage the pedal as shown in dotted lines, Figure 3. The clutch may now be engaged under the manual control of the driver in the usual fashion.

The device of Figure 4 may also be utilized to buff the clutch engagement. This structure comprises a dashpot cylinder, comprising a casing 76 pivotally secured to the floor board, the piston 78 being pivotally secured to the conventional clutch pedal 80. A manually operable spring pressed treadle member 82 serves to actuate a valve piston member 84 to selectively cover and uncover openings 86 in the cylinder casing to thereby determine the degree of dashpot effect of the structure and determine the rate of clutch pedal movement in a manner previously described. The mechanisms disclosed in Figures 3 and 4 are disclosed, described and claimed in my divisional application No. 44,529, filed October 11, 1935.

It will be understood that while the illustrated embodiments of the invention are described as shown, a considerable latitude is to be permitted in construction within the range of the appended claims.

I claim:

1. In an automotive vehicle provided with a clutch, a throttle controlled engine and an accelerator, a double-ended pressure differential operated motor for operating said clutch, an accelerator operated valve means for initiating the clutch disengaging and engaging operations of said motor, and a foot operated valve independent of said throttle and aforementioned valve means, said foot operated valve being so designed as to be normally inoperative, and when so inoperative, to facilitate the clutch disengaging operation of the motor and further designed to be selectively operable to control the rate of efflux of fluid from the pressure end of said motor to completely control the clutch engaging operation of the motor in synchronization with the operation of the throttle to control the speed of the engine.

2. Clutch control mechanism for an automotive vehicle provided with a clutch, comprising a pressure differential operated motor operably connected to the clutch, and means for controlling the clutch engaging operation of the motor by regulating the flow of fluid from the motor, said means comprising a cylinder provided with a plurality of vent openings, and further comprising a manually operable piston reciprocably mounted within said cylinder and operable to cover one or more of said vent openings to thereby predetermine the rate of efflux of fluid from the motor as the clutch is being engaged.

3. Clutch control mechanism for an automotive vehicle provided with a clutch, comprising an accelerator positioned to be operated by the right foot of the driver, power means for controlling the operation of the clutch, said power means comprising a pressure differential operated motor, a valve operable by the accelerator to initiate the clutch disengaging and engaging operations of the motor, and further comprising a valve for controlling the clutch engaging operation of the motor, and manually operable means for operating said latter valve and positioned for operation by the left foot of the driver.

4. Clutch control mechanism for an automotive vehicle provided with a clutch, comprising a double-ended pressure differential operated motor having a permanent vent opening in one end thereof, the power element of the motor being operably connected to the clutch, and means for controlling the clutch engaging operation of the motor comprising a cylinder operably connected to that end of the motor provided with the aforementioned vent opening, said cylinder being provided with a plurality of vent openings therein, and further comprising a manually operable piston reciprocably mounted within said cylinder and operable to cover one or more of said vent openings to thereby predetermine the rate of efflux of fluid from the pressure end of the motor as the clutch is being engaged.

VICTOR W. KLIESRATH.